United States Patent
Kobayashi et al.

(10) Patent No.: US 8,890,388 B2
(45) Date of Patent: Nov. 18, 2014

(54) WINDING STRUCTURE FOR A RECTANGULAR WIRE

(71) Applicant: Mitsuba Corporation, Kiryu, Gunma-ken (JP)

(72) Inventors: Kaoru Kobayashi, Kiryu (JP); Mikio Kawamura, Kiryu (JP); Masahiro Otawara, Kiryu (JP); Hiroshi Takahashi, Kiryu (JP)

(73) Assignee: Mitsuba Corporation, Kiryu-shi (JP)

(*) Notice: Subject to any disclaimer, the term of this patent is extended or adjusted under 35 U.S.C. 154(b) by 206 days.

(21) Appl. No.: 13/665,682

(22) Filed: Oct. 31, 2012

(65) Prior Publication Data

US 2013/0106232 A1 May 2, 2013

(30) Foreign Application Priority Data

Oct. 31, 2011 (JP) .................................. 2011-239121

(51) Int. Cl.
*H02K 3/04* (2006.01)

(52) U.S. Cl.
USPC .......................................................... 310/208

(58) Field of Classification Search
CPC .............. H02K 3/12; H02K 3/18; H02K 3/28
USPC ......... 310/179, 201, 202, 203, 204, 205, 206, 310/207, 208
See application file for complete search history.

(56) References Cited

U.S. PATENT DOCUMENTS

| | | | |
|---|---|---|---|
| 6,281,612 B1* | 8/2001 | Asao et al. .................... | 310/179 |
| 6,956,313 B2* | 10/2005 | El-Gabry et al. ............. | 310/179 |
| 8,053,943 B2* | 11/2011 | Kamibayashi et al. ........ | 310/208 |
| 2006/0197398 A1* | 9/2006 | Maynez ........................ | 310/198 |
| 2010/0320864 A1* | 12/2010 | Rahman et al. ............... | 310/201 |
| 2011/0163626 A1* | 7/2011 | Kamibayashi et al. ........ | 310/201 |
| 2011/0210558 A1* | 9/2011 | Stiesdal ......................... | 290/55 |

FOREIGN PATENT DOCUMENTS

JP 2008-061442 A 3/2008

* cited by examiner

*Primary Examiner* — Hanh Nguyen
(74) *Attorney, Agent, or Firm* — Kenyon & Kenyon LLP

(57) ABSTRACT

In this winding structure for a rectangular wire, a coil is formed that is provided with: a core that forms a core main body; a teeth portion that is formed extending inwards in a radial direction from the core; and a jaw portion that is formed extending in a circumferential direction from a distal end on the inner side in the radial direction of the teeth portion, and in which a rectangular wire is wound in multiple layers around a slot that is formed surrounded by the teeth portion, the core, and the jaw portion. The ellipticity, which is a ratio of a width dimension relative to a thickness dimension of a cross-section of the rectangular wire, becomes larger as it is wound from inner layers of the coil towards outer layers thereof, and the ellipticity of the rectangular wire in each of the layers is set in accordance with the width dimension of the slot in each layer of the coil such that the generation of gaps between the slot and the rectangular wire is suppressed.

14 Claims, 11 Drawing Sheets

WINDING STRUCTURE FOR A RECTANGULAR WIRE

BACKGROUND OF THE INVENTION

1. Field of the Invention

The present invention relates to a winding structure for a rectangular wire.

Priority is claimed on Japanese Patent Application No. 2011-239121, filed Oct. 31, 2011, the contents of which are incorporated herein by reference.

2. Description of Related Art

Generally, in an electric motor (i.e., a brushless motor) that is composed of a rotor in which magnets are provided, and of a stator core around which wire is wound, the performance of the electric motor improves proportionally as the density of the winding wires that is wound around the teeth portion of this stator core (i.e., the space factor) increases. For this reason, a structure is known in which, in order to make it easier to wind the winding wires around the teeth portion, laminated core piece segments that each include a teeth portion are provided separated from each other in the circumferential direction and extending in the axial direction of the electric motor. By providing this type of structure, winding wires can be firstly wound around each of the segmented laminated core pieces, and the segmented laminated core pieces can then be assembled together to form the stator core. As a result, the space factor can be improved.

Both winding wires that are formed by what are known as round wires, which have a circular cross-section, and winding wires that are formed by what are known as rectangular wires, which have a substantially rectangular cross-section, are known. Because of the characteristics provided by the shape of rectangular wires, the gaps between winding wires within the stator core are smaller compared to round wires. As a result, the space factor can be improved even further.

The technology disclosed in Japanese Patent Application, First publication No. 2008-61442 is known as a technology that improves the space factor when rectangular wires are wound around the teeth of the laminated core pieces. In the technology disclosed in Japanese Patent Application, First publication No. 2008-61442, the winding wires are wound around the teeth such that, round wire is being molded into rectangular wire, the cross-sectional shape of the rectangular wire changes in each lamination (i.e., winding layer) of the rectangular wire, the gap between the rectangular wire and the teeth is the minimum size, thereby improving the space factor.

Generally, the electric wire that is used for the winding wires of an electric motor is formed by covering the surface of a copper wire material with an enamel coating. If the cross-sectional configuration of a round wire that has an enamel coating provided on its surface in this manner is changed by being molded into a rectangular wire, the enamel coating comes under stress when the round wire is being molded into a rectangular shape. Because of this, there is a deterioration in flexibility when the wire is subsequently wound around the teeth. Here, the term 'flexibility' refers to the ability of the enamel coating to follow the rectangular wire being bent. If the flexibility of the enamel coating deteriorates, then it is unable to follow the bending of the rectangular wire, and in some cases the enamel coating may become damaged.

Accordingly, in order to improve the space factor, it is not feasible to change the cross-sectional configuration when a round wire is being molded into a rectangular wire.

It is an object of the foregoing invention to provide a winding structure for a rectangular wire that makes it possible to improve the space factor of a rectangular wire while limiting any reduction in the flexibility of the rectangular wire.

SUMMARY OF THE INVENTION

According to a first aspect of the present invention, in a winding structure for a rectangular wire includes: a core that forms a core main body; a teeth portion that is formed extending inwards in a radial direction from the core; and a jaw portion that is formed extending in a circumferential direction from a distal end on the inner side in the radial direction of the teeth portion, a coil is formed such that a rectangular wire is wound in multiple layers around a slot that is formed surrounded by the teeth portion, the core, and the jaw portion, and an ellipticity of the rectangular wire, which is a ratio of a width dimension of a cross-section thereof relative to a thickness dimension of the cross-section thereof, becomes larger as it is wound from inner layers of the coil towards outer layers thereof, and the ellipticity of the rectangular wire in each of the layers is set in accordance with the width dimension of the slot in each layer of the coil such that the generation of gaps between the slots and the rectangular wire is suppressed.

According to a second aspect of the present invention, in the winding structure for a rectangular wire according to the first aspect of the present invention, the core main body is made up of core pieces that are formed by splitting the core into segments, which is formed substantially in a circular cylinder shape, into a plurality of pieces in the circumferential direction, and one of the teeth portions is individually provided for each one of the split core main body segments, and the slots are formed so as to be surrounded by the respective split core main bodies, and by the teeth portions that are provided in the core main bodies, and by the jaw portions that are formed on the teeth portions, and, in at least a portion of the layers of the coil that is wound around the slot of the spilt core main bodies, the ellipticity of the rectangular wire that is wound onto the innermost side in the radial direction is different from the ellipticity of the rectangular wire that is wound onto the same layer on the outer side in the radial direction of that rectangular wire and also adjacent thereto, and the coil is housed within a coil housing portion of the slot.

According to a third aspect of the present invention, in the winding structure for a rectangular wire according to the first aspect of the present invention, the slots are formed such that an opening width thereof becomes gradually wider moving from a bottom portion of the slot towards the opening side thereof, and the ellipticity of the rectangular wire in each of the layers is set in accordance with the width dimension of the slot in each layer of the coil such that the generation of gaps between the slots and the rectangular wire is suppressed.

According to a fourth aspect of the present invention, in the winding structure for a rectangular wire according to the second aspect of the present invention, the slots are formed such that an opening width thereof becomes gradually wider moving from a bottom portion of the slot towards the opening side thereof, and the ellipticity of the rectangular wire in each of the layers is set in accordance with the width dimension of the slot in each layer of the coil such that the generation of gap between the slot and the rectangular wire is suppressed.

According to a fifth aspect of the present invention, in the winding structure for a rectangular wire according to the second aspect of the present invention, the ellipticity of the rectangular wire that is wound onto the innermost side in the radial direction is set larger than the ellipticity of the rectangular wire that is wound on adjacent thereto.

According to a sixth aspect of the present invention, in the winding structure for a rectangular wire according to the first aspect of the present invention, the starting end and final end of the coil are a round wire.

According to a seventh aspect of the present invention, in the winding structure for a rectangular wire according to the second aspect of the present invention, the starting end and final end of the coil are a round wire.

According to an eighth aspect of the present invention, in the winding structure for a rectangular wire according to the third aspect of the present invention, the starting end and final end of the coil are a round wire.

According to a ninth aspect of the present invention, in the winding structure for a rectangular wire according to the first aspect of the present invention, in the split core main bodies, a pair of the slots are provided sandwiching the teeth portion, and an insulating component that provides insulation between the coil and the core main bodies is mounted on the teeth portion, and the dimensions of the insulating component between bottom portions of the pair of slots are set such that an inner side in the radial direction of the teeth portion is smaller than an outer side in the radial direction thereof.

According to a tenth aspect of the present invention, in the winding structure for a rectangular wire according to the second aspect of the present invention, in the split core main bodies, a pair of the slots are provided sandwiching the teeth portion, and an insulating component that provides insulation between the coil and the core main bodies is mounted on the teeth portion, and the dimensions of the insulating component between bottom portions of the pair of slots are set such that an inner side in the radial direction of the teeth portion is smaller than an outer side in the radial direction thereof.

According to an eleventh aspect of the present invention, in the winding structure for a rectangular wire according to the third aspect of the present invention, in the split core main bodies, a pair of the slots are provided sandwiching the teeth portion, and an insulating component that provides insulation between the coil and the core main bodies is mounted on the teeth portion, and the dimensions of the insulating component between bottom portions of the pair of slots are set such that an inner side in the radial direction of the teeth portion is smaller than an outer side in the radial direction thereof.

According to a twelfth aspect of the present invention, the winding structure for a rectangular wire according to the first aspect of the present invention is applied to the formation of a coil in a stator core of a brushless motor.

According to a thirteenth aspect of the present invention, the winding structure for a rectangular wire according to the second aspect of the present invention is applied to the formation of a coil in a stator core of a brushless motor.

According to a fourteenth aspect of the present invention, the winding structure for a rectangular wire according to the third aspect of the present invention is applied to the formation of a coil in a stator core of a brushless motor.

According to the winding structure for a rectangular wire according to the first aspect of the present invention, by making the ellipticity of the rectangular wire the smallest at the innermost layer of the coil, the amount of deformation when the rectangular wire of the innermost layer is being molded from the round wire is reduced, and it is possible to limit any deterioration in the flexibility of the rectangular wire in the innermost layer. Moreover, in the portions where the rectangular wire is bent substantially 90° into an arc shape when the winding wires is being wound around the slots, because the radius of curvature of the rectangular wire decreases as it moves towards the inner side layers, the stress applied to these portions increases, however, because the ellipticity of the rectangular wire also decreases moving towards the inner side layers, it tends not to come under as much stress as in the inner side layers. Namely, it is possible to form a coil in which, because the ellipticity of the rectangular wire becomes greater moving from the inner layers of the coil towards the outer layers thereof, the flexibility of the rectangular wire does not deteriorate and the insulation properties thereof are maintained.

Moreover, the ellipticity of the rectangular wire in each of the layers is set in accordance with the width dimensions of the slots in each layer of the coil such that the generation of gaps between the slots and the rectangular wire is suppressed. Because of this, the space factor is improved.

According to the winding structure for a rectangular wire according to the second aspect of the present invention, in at least a portion of the layers in the split core main bodies, because the ellipticity of the rectangular wire that is wound onto the innermost side in the radial direction is different from the ellipticity of the rectangular wire that is wound onto the same layer as that rectangular wire, but on the outer side in the radial direction thereof and also adjacently thereto, the space factor is improved. Furthermore, because the coil can be housed within the coil housing portion of the slot, when the split core main bodies are joined together, it is possible to improve the space factor as much as possible without adjacent coils interfering with each other.

According to the winding structure for a rectangular wire according to the fifth aspect of the present invention, the ellipticity of the rectangular wire that is wound onto the innermost side in the radial direction is set larger than the ellipticity of the rectangular wire that is wound on adjacent to that rectangular wire. As a result, the dead space inside the coil housing portion can be filled in, and the space factor of the coil can be improved even further.

According to the winding structure for a rectangular wire according to any aspect of the sixth through eighth aspects of the present invention, the starting end and final end of the coil are formed from a round wire. Because of this, the same connecting method as a conventional connecting method can be employed when these are connected to a connecting component such as a busbar unit. As a result, alterations to manufacturing equipment and the like can be kept to a minimum, and manufacturing costs can be reduced.

According to the winding structure for a rectangular wire according to any aspect of the ninth through eleventh aspects of the present invention, the dimensions of the insulating component between bottom portions of the pair of slots are set so as to become smaller as they move inwards in a radial direction. Because of this, when the rectangular wire is being wound around the slots, movement of the rectangular wire towards the outer side in the radial direction can be suppressed.

According to the winding structure for a rectangular wire according to the twelfth aspect or thirteenth aspect of the present invention, in the stator of a brushless motor, it is possible to improve the space factor of a coil without reducing the flexibility of the rectangular wire. As a result, it is possible to improve the output density of the brushless motor, and achieve reductions in both size and cost.

DETAILED DESCRIPTION OF THE INVENTION

Hereinafter, an embodiment of the present invention will be described with reference made to the drawings in FIG. 1 through FIG. 11.

Figure 1:
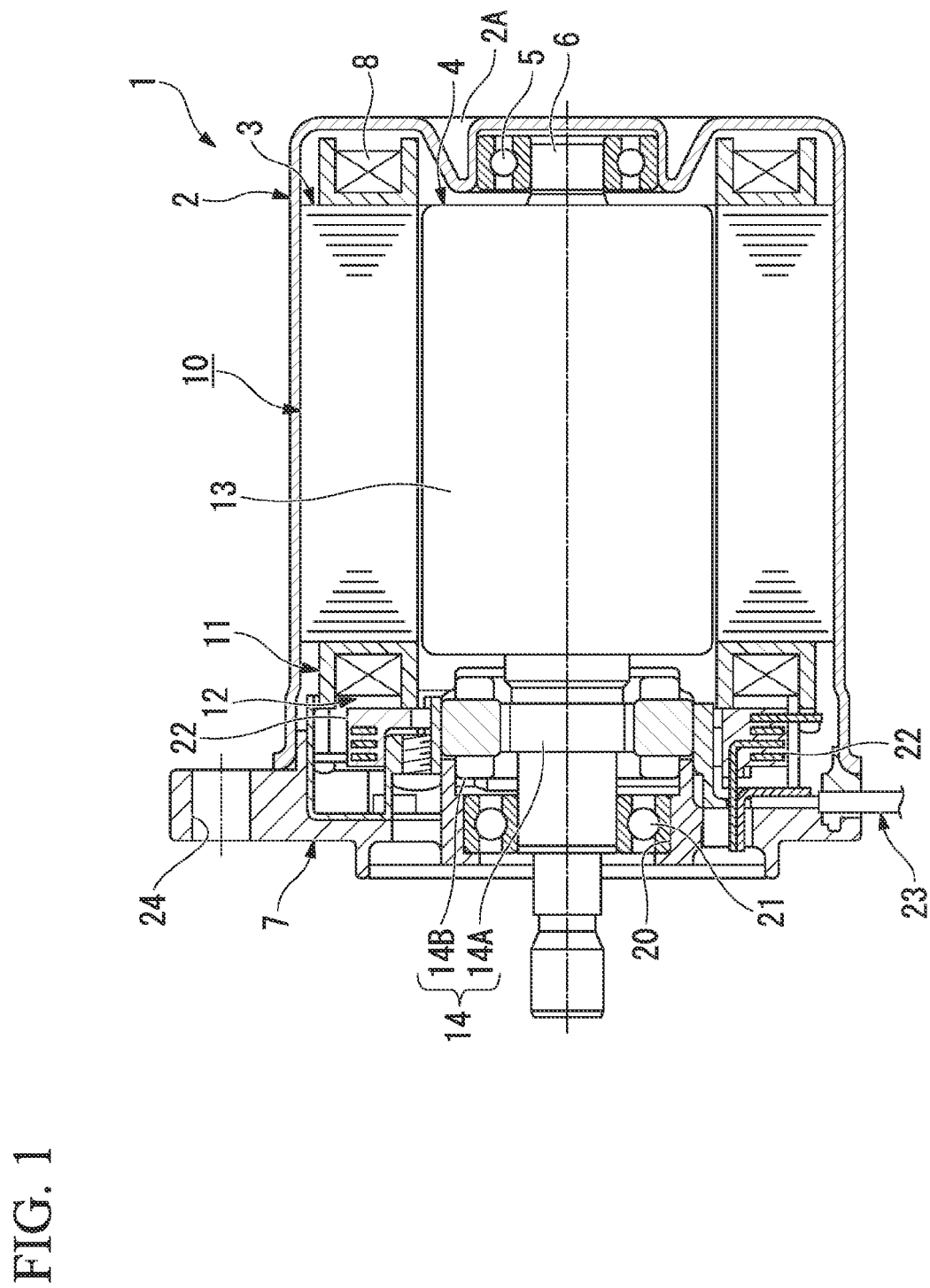
FIG. 1 is a cross-sectional view showing the structure of a brushless motor according to an embodiment of the present invention.
Figure 2:
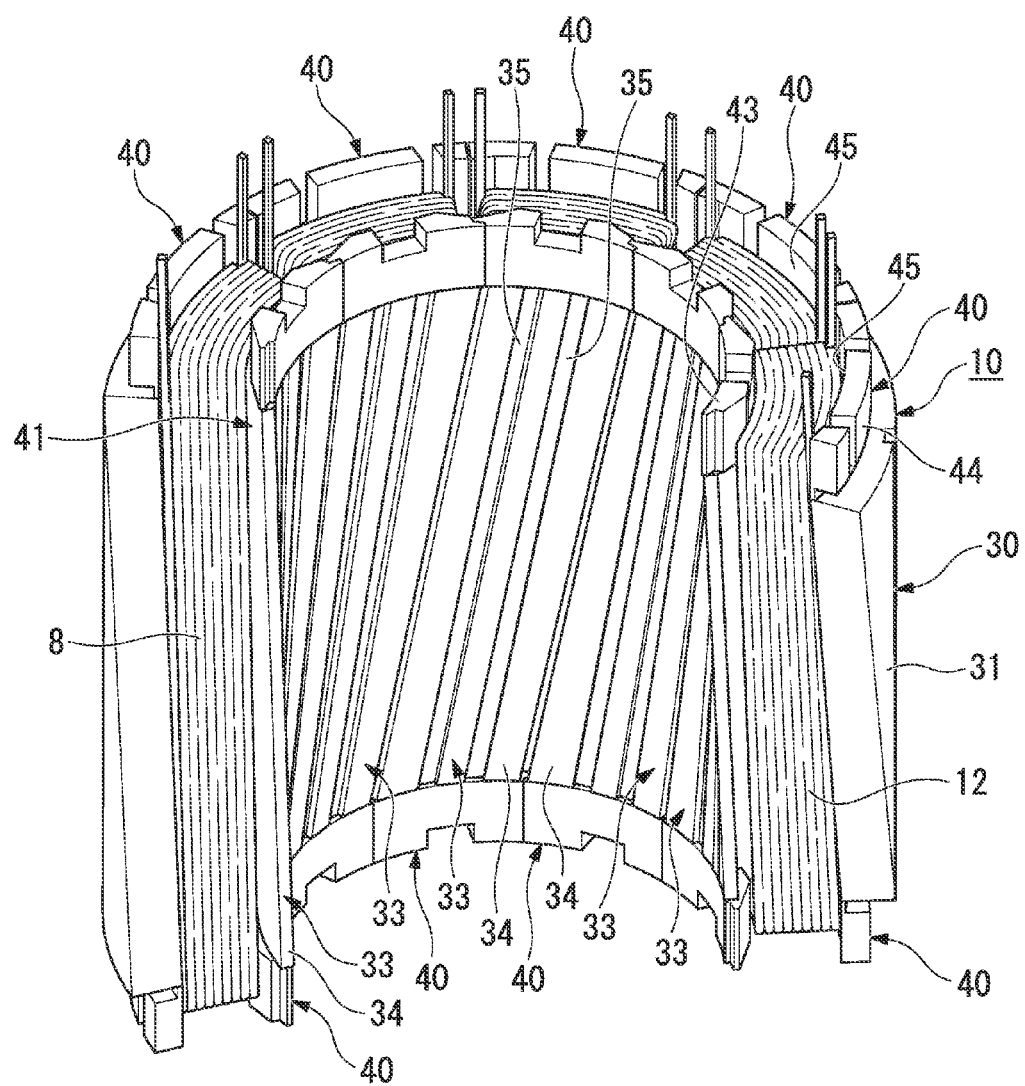
FIG. 2 is a perspective view showing the structure of a stator of a brushless motor according to an embodiment of the present invention.
Figure 3:
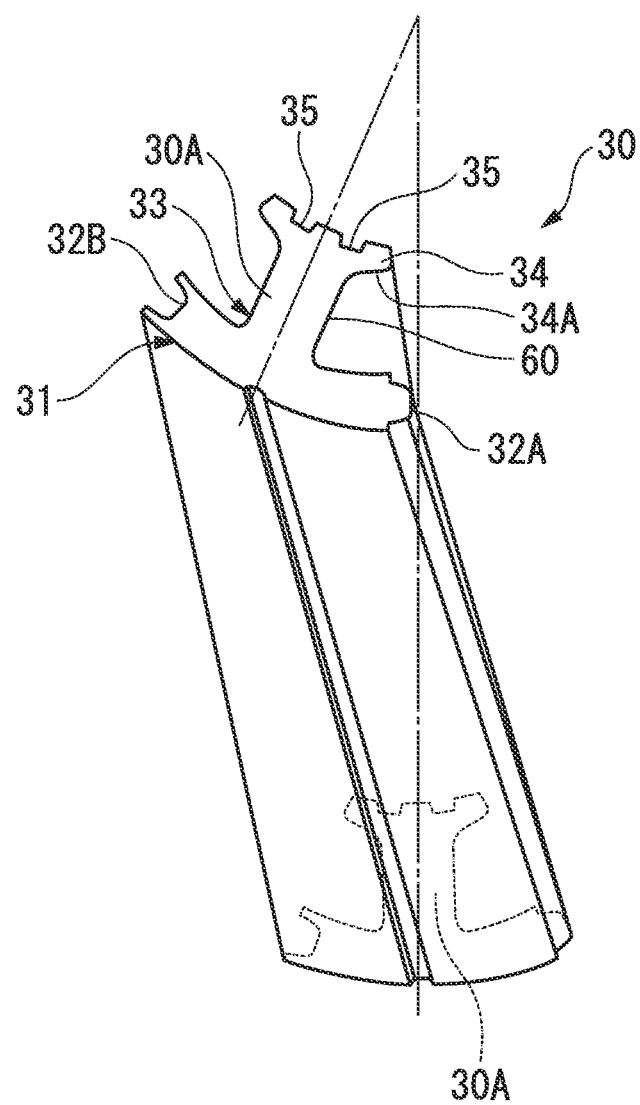
FIG. 3 is a perspective view showing the structure of a laminated core piece of a stator of a brushless motor according to an embodiment of the present invention.

As is shown in FIG. 1, a brushless motor 1 has a stator 3 that is press-inserted inside a housing 2, and a rotor 4 that is provided such that it is able to rotate freely relative to the stator 3. The brushless motor 1 is used, for example, as an electric motor for an electric power steering (EPS) unit.

The housing 2 has a bottom portion and is formed in a cylindrical shape. The stator 3 is press-inserted inside the internal circumference of the cylindrical portion. A bearing 5 is press-inserted inside a center portion of an end portion (the bottom portion) 2A of the housing 2. A rotation shaft 6 of the rotor 4 is rotatably supported in the bearing 5. An opening portion in the housing 2 is closed off by a bracket 7.

The stator 3 has a substantially circular cylinder-shaped stator core 10. After a teeth portion that is formed extending inwards in a radial direction from the stator core 10, and an insulating component 11 (described below) that is inserted inside slots formed in the teeth portion have been mounted in position, a winding wire in the form of a rectangular wire 12 having a substantially rectangular cross-section is wound around them. A coil 8 is formed as a result of winding on this rectangular wire 12.

In the rotor 4, magnets 13 and a resolver rotor 14A of a resolver 14, which is used for position detection, are arranged in the foregoing sequence on the rotation shaft 6. The magnets 13 are magnetized such that their magnetic polarities alternate sequentially in the circumferential direction.

The bracket 7 has a circular disc shape. A hole 20 is formed in the center portion of the bracket 7. A bearing 21 is press-inserted inside the hole 20 and is fixed in this position. The rotation shaft 6 is rotatably supported by the bearing 21. Furthermore, a resolver stator 14B that forms the resolver 14 is fixed to the resolver 14 such that the position of the resolver stator 14B matches the position of the resolver stator 14A. The resolver stator 14B is able to detect the rotation position of the resolver stator 14A, which rotates integrally with the rotation shaft 6. Moreover, a plurality of terminals 22 are arranged on the housing 2 side of the bracket 7. The terminals 22 perform the role of electrically connecting the stator winding wire of the rectangular wire 12 on the stator 3 side to a lead wire 23 that leads in from the exterior circumference of the bracket 7. The terminals 22 are able to supply current to the rectangular wire 12 from an external power supply which is connected via the lead wire 23. In addition to this, a bolt hole 24 that is used when the brushless motor 1 is being fixed in place is provided in an outer circumferential portion of the bracket 7.

Here, a split-core system that enables the stator core 10 to be split into individual segments in the circumferential direction is used. Namely, the stator core 10 is formed by joining together in a circular pattern laminated core pieces 30 that are separated into a plurality of segments in the circumferential direction. As is shown in FIG. 2 through FIG. 5, the laminated core pieces 30 each have a core main body 31 that extends in the circumferential direction. The core main bodies 31 are components that form the annular magnetic path of the stator core 10 when the laminated core pieces 30 are joined together in a circular pattern, and they are press-inserted inside the inner circumferential surface of the housing 2. The core main bodies 31 are formed substantially in an arc shape when seen in plan view. Moreover, the core main bodies 31 have a predetermined skew angle such that they stand on a slant and are twisted relative to the longitudinal direction of the stator core 10 (relative to the axial direction of the brushless motor).

The two end portions in the circumferential direction of the core main bodies 31 form joining portions 32A and 32B that are joined to other laminated core pieces 30 by being press-inserted therein. One joining portions 32A have a convex configuration, while the other joining portions 32B have a concave configuration that is shaped so as to be able to receive the joining portions 32A. Teeth portions 33 that form salient poles extend as an integral unit from substantially a center portion in the circumferential direction on the inner side in the radial direction of the core main bodies 31 towards the inner side in the radial direction of the stator core 10 (towards the center of rotation). These teeth portions 33 also have the same type of skew angle as the core main bodies 31.

Jaw portions 34 that extend in the circumferential direction are formed on end portions on the inner side in the radial direction of the teeth portions 33. Slots 60 that are used to wind on the rectangular wire 12 are formed so as to be enclosed by the teeth portions 33, the core main bodies 31, and the jaw portions 34. Note that a pair of slots 60 are provided on each laminated core piece 30 such that they sandwich the teeth portions 33. Here, the inner sides of virtual lines (the double dot chain lines in FIG. 5) that join together an end portion in the circumferential direction of a core main body 31 and an end portion in the circumferential direction of a jaw portion 34 form coil housing portions 61 in the slots 60.

Two concave portions 35 are formed at the same skew angle as the teeth portions 33 in the outer surface of the end portions on the inner side in the radial direction of the teeth portions 33. Three teeth are formed by the two concave portions 35 in each laminated core piece 30. In contrast, inclined wall portions (slot inner side wall portions) 34A that gradually widen as they move towards the opening portion of the slots 60 are formed in portions of the jaw portions 34 that face the slots 60. As a result, the slots 60 are formed such that the opening portions thereof become gradually wider as they move from slot bottom portions 33A towards the opening side of the slots 60.

The insulating components 11 are provided such that they surround the teeth portions 33 that are formed in the manner described above. The insulating components 11 are each formed by a pair of resin insulators 40 that are provided one at a time such that they sandwich the teeth portions 33 from the two end portions 30A and 30A in the longitudinal direction of the laminated core pieces 30 (in the axial direction), and by a pair of paper-shaped, flexible insulating papers 41 that are inserted into the slots 60 that are enclosed by the teeth portions 33, the core main bodies 31, and the jaw portions 34. Overall, the insulating components 11 are formed substantially in a square shape. The rectangular wire 12 is wound around the teeth portions 33 with the coil 8 being insulated from the laminated core pieces 30 (the core main bodies 31) by the insulating components 11, which are formed by the insulators 40 and the insulating papers 41.

Figure 4:
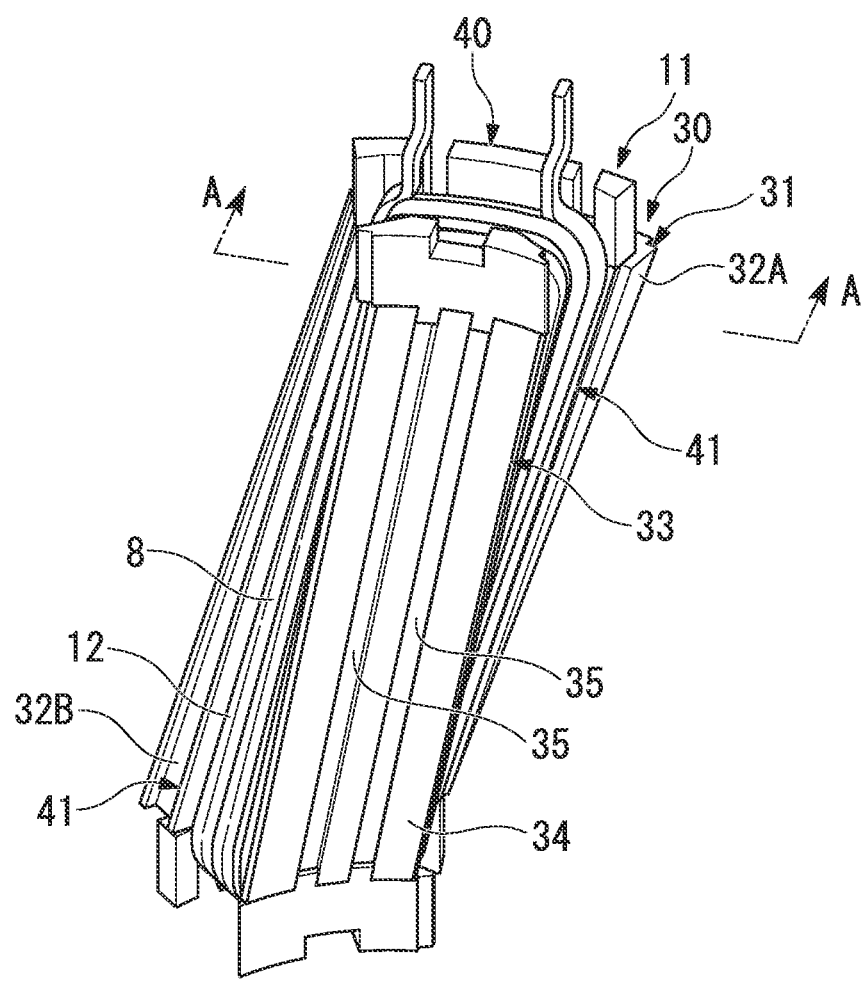
FIG. 4 is a perspective view showing a state in which a rectangular wire is wound around a laminated core piece of a brushless motor according to an embodiment of the present invention.
Figure 5:
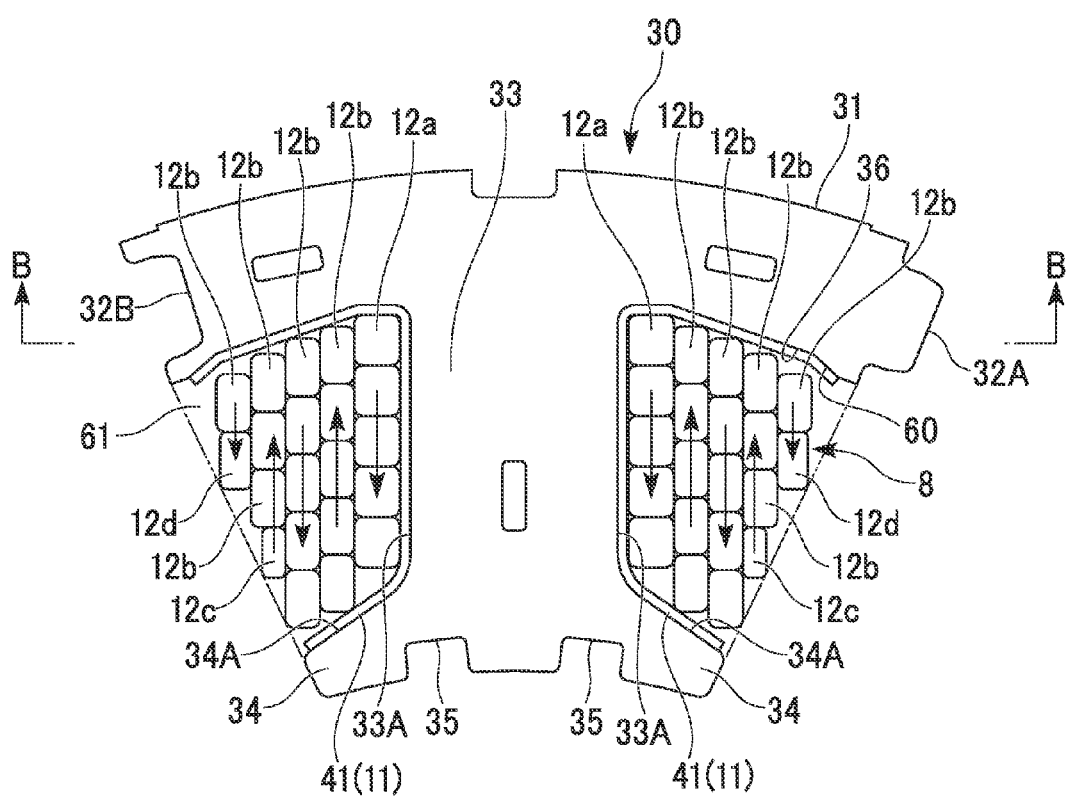
FIG. 5 is a cross-sectional view taken along a line A-A in FIG. 4.

As is shown in FIG. 4 and FIG. 5, the rectangular wire 12 is wired from the outer side in the radial direction of the slots 60 along the insulating papers 41 that are provided on the side surfaces of the teeth portions 33. Thereafter, the rectangular wire 12 is wound again around the slots 60 via the insulators 40 that are provided onto both end portions 30A and 30B of laminated core piece 30. The rectangular wire 12 is wound a plurality of times (21 times in this embodiment) in the above-described sequence onto the teeth portions 33 so that a plurality of winding layers (five layers in this embodiment) are formed. Specifically, the rectangular wire 12 is wound five times in each of the first through third winding layers, four times in the fourth winding layer, and twice in the fifth winding layer.

Here, if a ratio of a width dimension (i.e., a dimension found by measuring in the direction in which the rectangular wire strands 12 are mutually adjacent to each other in the same layer) relative to a thickness dimension (i.e., a dimension found by measuring in the lamination direction) of a cross-sectional configuration of the rectangular wire 12 is defined as the ellipticity of the rectangular wire 12, then the ellipticity of the rectangular wire 12a in the first layer is set smaller than the ellipticities of the rectangular wires 12b, 12c, and 12d in each one of the second through fifth layers.

Note that the term 'rectangular wire 12' is a general term that encompasses the rectangular wires 12a, 12b, 12c, and 12d.

Moreover, the ellipticity of the rectangular wire 12a of the first layer is set in accordance with the width dimension of the slot 60 in the first layer (i.e., the length in the radial direction thereof measured on the side surface of the teeth portion 33) such that the gap generated between the slot 60 and the rectangular wire 12a when the rectangular wire 12a of the first layer is being wound on and is in contact with itself is at the minimum (in other words, such that the creation of a gap is suppressed). This is in order to improve the space factor.

Note that, in the present embodiment, the cross-section of the rectangular wire 12a of the first layer is formed substantially square.

The ellipticities of the rectangular wires 12b, 12c, and 12d of the second through fifth layers are set larger than the ellipticity of the rectangular wire 12a of the first layer. The cross-sections of the rectangular wires 12b, 12c, and 12d of the second through fifth layers are formed substantially rectangular. Moreover, excepting the rectangular wire 12c on the innermost side in the radial direction of the fourth layer and the rectangular wire 12d on the innermost side in the radial direction of the fifth layer, the ellipticities of the rectangular wire 12b of the second through fifth layers are all set the same. Note that the ellipticities of the rectangular wire 12b in the second and third layers are set so as to become slightly larger moving from the inner layer of the coil towards the outer layer thereof. As a result, in the slot 60 that is formed such that the opening width thereof becomes gradually larger as it moves from the slot bottom portion 33A towards the opening side of the slot 60, the ellipticity is adjusted in each of the layers that are wound on five times (the first through third layers) in accordance with the slot opening width dimension of each layer so that the gap between the slot 60 and the rectangular wire 12b disappears.

Moreover, the ellipticities of the rectangular wire 12b in the second and third layers are set in accordance with the width dimension of the slot 60 in the second and third layers such that the gap generated between the slot 60 and the rectangular wire 12b when the rectangular wire 12b of each of the second and third layers is being wound on and is in contact with itself is at the minimum (in other words, such that the creation of a gap is suppressed). This is because the width of the slot 60 in the first layer and the width of the slot 60 in the second and third layers have different dimensions. By changing the ellipticity of the rectangular wire 12 depending on the layer in this manner, it is possible to improve the space factor.

In the case of the fourth layer, the ellipticity of the rectangular wire 12c that is wound on the innermost side in the radial direction is set so as to be greater than the ellipticity of the rectangular wire 12b that is wound further on the outer side in the radial direction than is the rectangular wire 12c of the fourth layer.

The reason for this is as follows. If the rectangular wire 12 of the fourth layer is wound on with all of the ellipticities thereof set the same as the ellipticity of the rectangular wire 12b, then, in some cases, a portion of the rectangular wire 12b that is wound onto the innermost side in the radial direction is not able to fit inside the coil housing portion 61 of the slot 60 and protrudes from the coil housing portion 61. If a portion of the coil 8 protrudes from the coil housing portion 61 in this manner, then when the laminated core pieces 30 are joined together in a circular pattern to form the stator core 10, the coils 8 that have been wound around adjacent slots 60 interfere with each other, and the task of assembling the stator core 10 becomes impossible.

Therefore, in the fourth layer, the ellipticity of the rectangular wire 12c that is wound onto the innermost side in the radial direction is adjusted so as to be set larger than the ellipticity of the rectangular wire 12b. As a result, the rectangular wire 12c that is wound onto the innermost side in the radial direction in the fourth layer can be housed within the coil housing portion 61, and it is possible to prevent any gaps from being created so that the dead space inside the coil housing portion 61 is filled in as much as possible.

In the case of the fifth layer, the ellipticity of the rectangular wire 12d that is wound on the innermost side in the radial direction is set so as to be greater than the ellipticity of the rectangular wire 12b that is wound further on the outer side in the radial direction than is the rectangular wire 12d of the fifth layer. The reason for this is the same as in the case of the rectangular wire 12c that is wound onto the innermost side in the radial direction of the fourth layer.

By setting ellipticities of the rectangular wires 12c and 12d that are wound onto the innermost sides in the radial direction in the fourth and fifth layers in the manner described above, it is possible to improve the space factor without the coils 8 that are wound around adjacent slots 60 interfering with each other.

Moreover, the ellipticity of the rectangular wire 12a of the first layer is set smaller than the ellipticities of the rectangular wires 12b, 12c, and 12d of the second through fifth layers. The reason for this is as follows.

As is described below, the rectangular wire 12 is formed by squeezing a round element wire 71, which is formed by a round wire, between rollers 73. Because this round element wire 71 is formed by providing an enamel coating around a copper wire core, the enamel coating comes under stress when the round element wire 11 is being deformed by this squeezing, and in some cases the flexibility of the rectangular wire 12 is deteriorated. Here, when the rectangular wire 12 is being molded from the round element wire 11, the greater the ellipticity of the rectangular wire 12 after the molding process, the greater the amount of deformation of the actual enamel coating itself, and the amount of stress the enamel coating is placed under also increases. Conversely, the smaller the ellipticity of the rectangular wire 12 after the molding process, the smaller the amount of deformation of the actual enamel coating itself, and the amount of stress the enamel coating is placed under also decreases.

Figure 6:
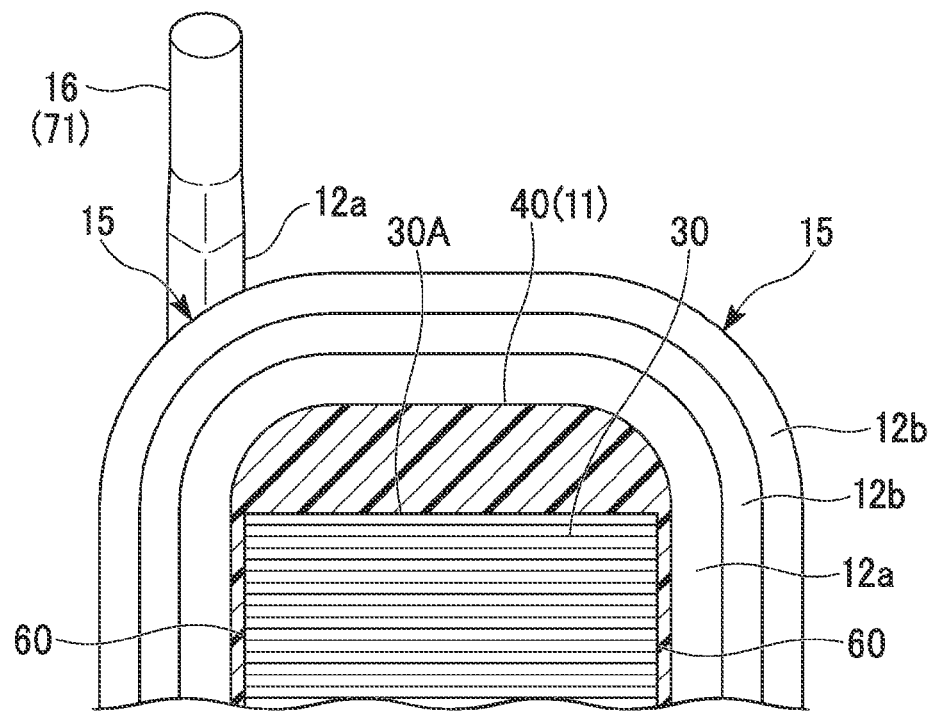
FIG. 6 is a cross-sectional view taken along a line B-B in FIG. 5.

When the rectangular wire 12 is being wound around the teeth portion 33, as is shown in FIG. 6, there is a portion thereof that becomes wound around the outer side of the insulator 40 that is provided on the end portion 30A of the teeth portion 33, and in a portion that is wound from the slot 60 around the outer side of the insulator 40, and a portion that is wound once again around the slot 60 from the outer side of the insulator 40 (each of these are referred to below as a 'bend portion 15'), the rectangular wire 12 is bent each time at approximately 90 degrees in a circular arc shape. In addition, when the rectangular wire 12 is being wound, the enamel coating on the rectangular wire 12 comes under stress in these bend portions 15. In this case, because the rectangular wire 12 is bent into an arc shape whose radius of curvature decreases as it moves towards the layers on the inner side, the stress that is placed on the enamel coating increases. Accordingly, the flexibility of the rectangular wires 12a of the first layer tends to deteriorate the most easily.

Therefore, by setting the ellipticity of the rectangular wire 12a of the first layer smaller than the ellipticities of the rectangular wires 12b, 12c, and 12d of the second through fifth layers, in addition to reducing the stress on the enamel coating to a minimum by reducing the extent of the deformation when the round element wire 11 is being molded into the rectangular wire 12a of the first layer, which is the innermost layer, it is also possible to reduce to a minimum the stress on the enamel coating in the bend portions 15 when the rectangular wire 12a of the first layer is being wound around the teeth portion 33. By doing this, it is possible to limit the deterioration in the flexibility of the rectangular wire 12a of the first layer.

Namely, by setting the ellipticity of the rectangular wire 12 such that it increases as it moves from the inner layers of the coil 8 towards the outer layers thereof, it is possible to form a coil 8 in which there is no deterioration in the flexibility of the rectangular wire 12.

According to this winding wire structure, it is possible to reduce to a minimum the gaps within the coil housing portion 61 of the slots 60 in the laminated core pieces 30. As a result, the space factor of the winding wires of the stator core 10 can be improved.

Note that the location where the ellipticity of the rectangular wire 12 is changed (namely, the location where the cross-sectional configuration is changed) is not particularly limited. It is preferable for the location where the ellipticity is changed to not be within the slot 60, but to be on the insulators 40 that are provided on the two end portions 30A and 30A of the laminated core pieces 30. As a result, it is possible to more accurately arrange the rectangular wire 12 in lines within the slot 60 without any gaps being created, and to improve the space factor even further.

Next, a method of molding the rectangular wire 12 will be described based on FIG. 7 and FIG. 8.

Figure 7:
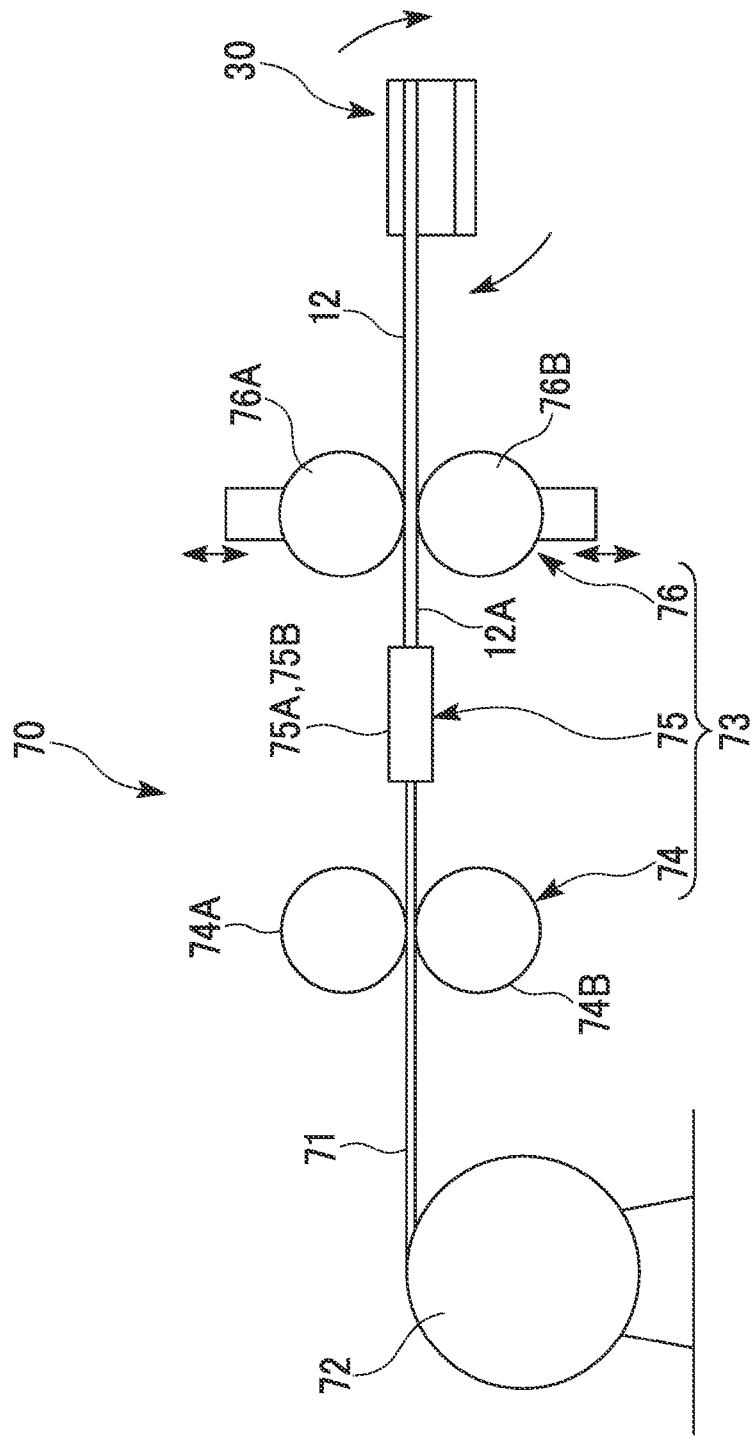
FIG. 7 is a structural view of a rectangular wire molding apparatus that is used in an embodiment of the present invention.
Figure 8:
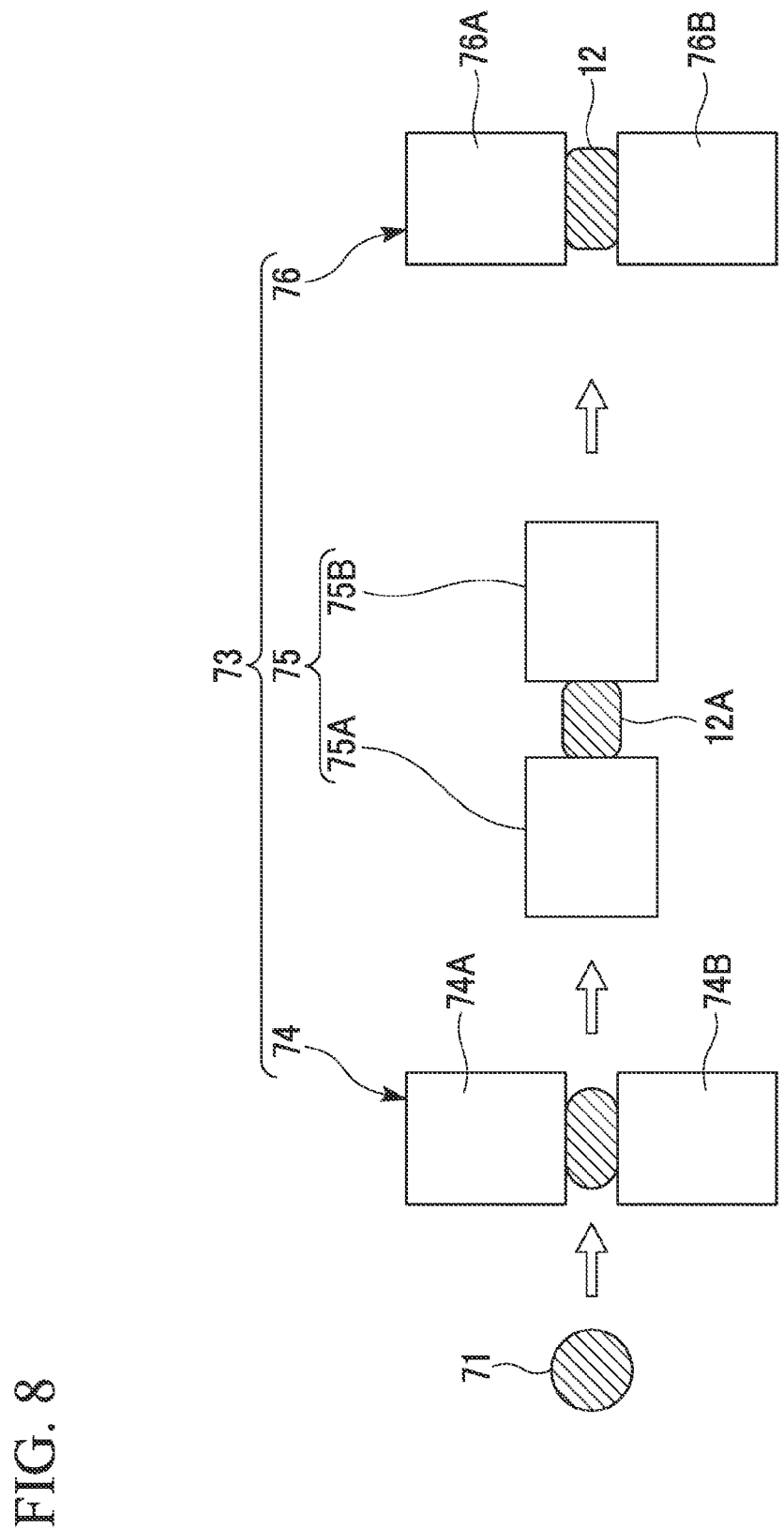
FIG. 8 is an explanatory view illustrating a method of molding a rectangular wire in an embodiment of the present invention.

As is shown in FIG. 7 and FIG. 8, a rectangular wire molding apparatus 70 is provided with a winding wire reel 72 onto which the round element wire 71, which has a circular cross-section, has been wound, and rectangular wire molding rollers 73 that are used to form a rectangular wire. The winding wire reel 72 is supported such that it is able to rotate freely. The rectangular wire molding rollers 73 are formed by three rollers 74, 75, and 76, namely, by a first roller 74, a second roller 75, and a third roller 76.

The first roller 74 is a component that is used to squeeze the round element wire 71 from above and below. A pair of top and bottom rollers 74A and 74B are provided in the first roller 74 such that they are able to rotate freely. The second roller 75 is a component that is used to squeeze the round element wire 71 from the sides. A pair of left and right rollers 75A and 75B are provided in the second roller 75 such that they are able to rotate freely. The third roller 76 is a component that is used to once again squeeze the round element wire 71 from above and below. A pair of top and bottom rollers 76A and 76B are provided in the third roller 76 such that they are able to rotate freely. The rollers 76A and 76B are each provided such that they are able to slide in a vertical direction. In addition, the third roller 76 is electrically connected to a control unit (not shown), and is constructed such that the distance between the rollers 76A and 76B can be appropriately set based on signals from the control unit. Moreover, the laminated core pieces 30 that constitute the stator core 10 are set on the downstream side (on the right side in FIG. 7) of the rectangular wire molding rollers 73 such that they are able to rotate in the winding direction of the rectangular wire 12.

The round wire 71 that is drawn from the wire storage reel 72 is firstly squeezed from above and below as it passes through the first roller 74. Next, the round wire 71 is squeezed from the sides as it passes through the second roller 75. As a result, a temporary rectangular wire 12A having a substantially square cross-section and having the smallest ellipticity is formed.

The ellipticity of the temporary rectangular wire 12A is set the same as the ellipticity of the rectangular wire 12a that is wound as the first layer around the teeth portion 33 of the laminated core pieces 30.

Thereafter, the temporary rectangular wire 12A is squeezed to a predetermined thickness by the third roller 76, and the temporary rectangular wire 12A is formed into the rectangular wires 12b, 12c, and 12d that have predetermined ellipticities. Namely, the ellipticity of the rectangular wire 12 is decided by the third roller 76. The rectangular wire 12 that has been formed having a predetermined ellipticity is then wound onto the slots 60 of the laminated core pieces 30. Note that the control section that is electrically connected to the third roller 76 is programmed in advance such that the distance between the rollers 76A and 76B changes when the temporary rectangular wire 12A has passed through the third roller 76 for a predetermined length. Because of this, when the rectangular wire 12a of the first layer is being formed, the third roller 76 is set at the maximum width so that it moves away from the temporary rectangular wire 12A and does not contribute to the molding process.

Namely, the third roller 76 is programmed such that the rollers 76A and 76B slide in a direction in which they approach each other when the temporary rectangular wire 12A has passed for the distance of one turn (for a distance equivalent to one layer of the winding layers) around the slots 60. As a result, the thickness of the rectangular wire 12 in the second and subsequent layers in the slots 60 is thinner than in the first layer. Namely, the ellipticity of the rectangular wire 12 in the second and subsequent layers is larger than the ellipticity of the rectangular wire 12a in the first layer.

In this manner, in the rectangular wire 12 of the second and subsequent layers, the ellipticity is decided by squeezing the round wire 71 once in a horizontal direction and twice in a vertical direction.

Here, the level of stress that is applied to the enamel coating of the round wire 71 is also changed by the amount that the round wire 71 is squeezed by the respective rollers 74, 75, and 76 (by the amount of deformation). When a wire having a particularly large ellipticity is being molded, the stress on the enamel coating also increases.

Note that when the rectangular wire 12 is being wound around the slots 60, as is shown by the arrows in FIG. 5, in the odd-numbered first, third, and fifth layers, the rectangular wire 12 is wound from the outer side in the radial direction towards the inner side in the radial direction, while in the even-numbered second and fourth layers, the rectangular wire 12 is wound from the inner side in the radial direction towards the outer side in the radial direction.

When the rectangular wire 12 is being wound on in this manner, when transitioning from the molding of the rectangular wire 12a that is wound onto the innermost side in the radial direction of the first layer to the molding of the rectangular wire 12b that is wound onto the innermost side in the radial direction of the second layer, the distance between the rollers 76A and 76B of the third roller 76 is narrowed so as to correspond to the ellipticity of the rectangular wire 12b.

Moreover, when transitioning from the molding of the rectangular wire 12b that is wound onto the innermost side in the radial direction of the third layer to the molding of the rectangular wire 12c that is wound onto the innermost side in the radial direction of the fourth layer, the distance between the rollers 76A and 76B of the third roller 76 is narrowed so as to correspond to the ellipticity of the rectangular wire 12c. In this state, once the temporary rectangular wire 12A has been passed for a length of one turn around the slots 60, the distance between the rollers 76A and 76B of the third roller 76 is once again widened so as to correspond to the ellipticity of the rectangular wire 12b.

Furthermore, when transitioning from the molding of the rectangular wire 12b that is wound onto the outermost side in the radial direction of the fifth layer to the molding of the rectangular wire 12d that is wound onto the innermost side in the radial direction of the fifth layer, the distance between the rollers 76A and 76B of the third roller 76 is narrowed so as to correspond to the ellipticity of the rectangular wire 12d.

In this manner, by controlling the dimension of the distance between the rollers 76A and 76B of the third roller 76, the rectangular wires 12a, 12b, 12c, and 12d, which all have different ellipticities, can each be wound onto desired positions in the radial direction of the desired winding layer on the laminated core pieces 30 of the stator core 10.

As a result, it is possible to limit the gaps inside the coil housing portion 61 of the slots 60 in the laminated core pieces 30 to a minimum, and to improve the space factor of the rectangular wire 12, which forms the winding wires of the stator core 10.

Note that, as is shown in FIG. 6, if the starting end 16 and final end (not shown) of the rectangular wire 12 that has been wound around the laminated core pieces 30 are not molded into the round element wire 71 without being molded into the rectangular wire 12, then the same method as a conventional connecting method can be employed when the starting end 16 and final end are connected to a connecting component such as a busbar unit. As a consequence of this, alterations to the manufacturing equipment and the like can be kept to a minimum, and manufacturing costs can be reduced.

As is shown in FIG. 5, in the core main bodies 31 of the laminated core pieces 30, the outer circumferential side slot-facing surfaces (the slot outer-side wall portions) 36 that face the slots 60 are not perpendicular to the radial direction of the stator core 10 (the laminated core pieces 30), but instead have what is known as an overhang shape whereby they slope outwards in the radial direction as they move towards the inner side in the circumferential direction.

Because of this, when the rectangular wire 12 is being wound around the teeth portions 33 of the laminated core pieces 30, it is not possible for the rectangular wire 12 to be inserted into the slots 60 from an orthogonal direction relative to the radial direction of the stator core 10 (the laminated core pieces 30). Because of this, as is shown in FIGS. 9A, 9B, and 9C, and FIGS. 10A, 10b, and 10C, the rectangular wire 12 is wound on while it is being guided into the slots 60 using guides 50.

The guides 50 are placed in the slots 60 on the two sides so as to sandwich the teeth portion 33 of the laminated core pieces 30. The guides 50 have an arm 51 that extends substantially parallel with the slot facing surfaces (the slot outer-side wall portions) 36 of the core main bodies 31. The surface on the side of the arms 51 that faces the slot facing surfaces (the slot outer-side wall portions) 36 forms a guide surface 52 that guides the rectangular wire 12 as the rectangular wire 12 slides along it. The guides 50 are provided such that they are able to move in the radial direction of the laminated core pieces 30 (the direction X shown in FIGS. 9A, 9B, and 9C and FIGS. 10A, 10B, and 10C), and in an orthogonal direction relative to this radial direction (the direction Y shown in FIGS. 9A, 9B, and 9C and FIGS. 10A, 10B, and 10C). By moving the guides 50, the arms 51 can be moved forwards into the slots 60, or they can be moved backwards out from the slots 60. Moreover, by moving the guides 50 in the X direction, it is possible to guide the rectangular wire 12 that is wound around each layer. By moving the guide 50 in the Y direction, it is also possible to switch the layer of the rectangular wire 12.

Hereinafter, an operation of the guides 50 will be described with reference made to FIGS. 9A, 9B, and 9C and FIGS. 10A, 10B, and 10C.

Firstly, the winding of the rectangular wire 12a of the first layer will be described with reference made to FIGS. 9A, 9B, and 9C.

Figure 9A:
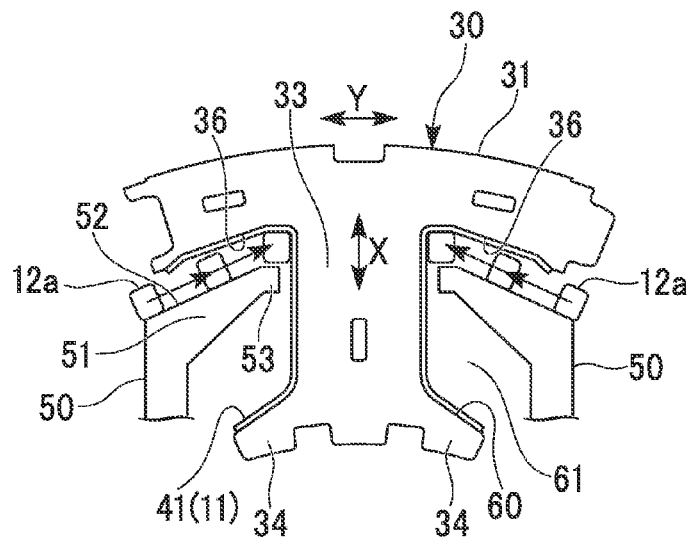
FIG. 9A is a view illustrating a procedure employed to wind a first layer of a rectangular wire around a laminated core piece of a brushless motor according to an embodiment of the present invention.

When the rectangular wire 12a of the first layer is to be wound around the teeth portion 33, firstly, as is shown in FIG. 9A, the gaps between the guide surfaces 52 of the arms 51 and the slot facing surfaces (the slot outer-side wall portions) 36 of the core main bodies 31 are set at a size that enables the rectangular wires 12a to slide over the guide surfaces 52 with substantially no gaps being created. In addition, the guides 50 are placed such that, when the rectangular wire 12a on the outermost side in the radial direction is wound on while in contact with insulating component 11, a distal end portion 53 of the arm 51 receives a portion of a side face of the rectangular wire 12a from the inner side in the radial direction.

The winding on of the rectangular wire 12a of the first loop of the first layer is started from a state in which the guides 50 are positioned in the above-described manner, and the winding on of the rectangular wire 12a around the teeth portion 33 is then continued while the guides 50 together with the laminated core pieces 30 are being rotated, and during the period in which the laminated core pieces 30 are being rotated for one rotation, the guides 50 are moved towards the inner side in the radial direction for the distance of the width dimension of the rectangular wire 12a. The rectangular wire 12a is wound on while it is being guided by the insulating component 11 (the insulators 40 and the insulating paper 41) and by the guide surfaces 52. FIG. 9A is a typical view showing a state partway through the winding of the rectangular wire 12a of the first loop of the first layer.

In the same way, each time the laminated core piece 30 is rotated for one rotation, the rectangular wire 12a of the first layer is wound in sequence at the same time as the guides 50 are moved the distance of the width dimension of the rectangular wire 12a towards the inner side in the radial direction. In this manner, the rectangular wire 12a is wound on for five loops while being guided by the guide surfaces 52 and by the wall surface on the inner side in the radial direction of the rectangular wire 12a that has already been wound on at the first layer. At this time, the cross-section of the rectangular wire 12a of the first layer is formed substantially square, however, the actual ellipticity is adjusted such that gaps between the slots 60 and the rectangular wire 12a are disappeared.

Figure 9B:
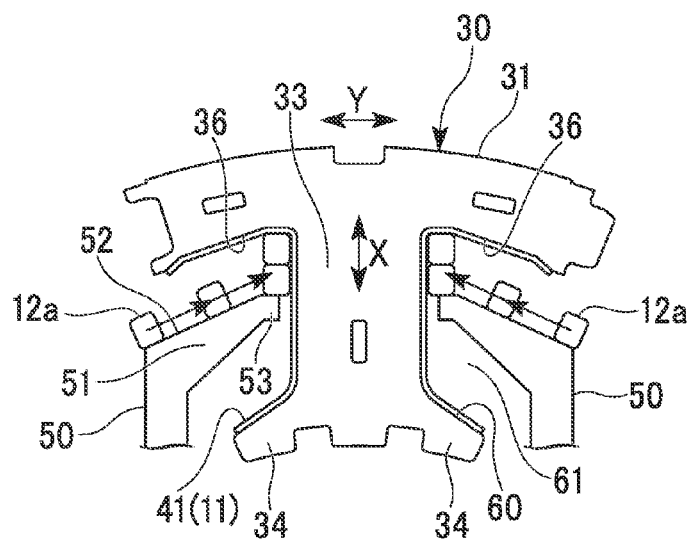
FIG. 9B is a view illustrating a procedure employed to wind a first layer of a rectangular wire around a laminated core piece of a brushless motor according to an embodiment of the present invention.

FIG. 9B is a typical view showing a state partway through the winding on of the rectangular wire 12a of the second loop of the first layer. FIG. 9C is a typical view showing a state partway through the winding of the rectangular wire 12a of the third loop of the first layer.

Note that the movement of the guides 50 in the odd-numbered layers (the first, third, and fifth layers) in which the rectangular wire 12 is wound on while it is being moved from the outer side in the radial direction towards the inner side in the radial direction is substantially the same as the movement of the guides 50 in the above-described first layer.

Next, the winding of the rectangular wire 12b of the second layer on top of the rectangular wire 12a of the first layer will be described with reference to FIGS. 10A, 10B and 10C.

As is described above, the rectangular wire 12b of the second layer is wound on from the innermost side in the radial direction towards the outer side in the radial direction. Because of this, when the rectangular wire 12b of the first loop of the second layer is being wound on, as is shown in FIG. 10A, the guides 50 are placed such that the distal end portions 53 of the arms 51 are placed such that they are almost in contact with the jaw portions 34 of the laminated core pieces 30, and such that the guide surfaces 52 on the distal end portions 53 are substantially flush with the surfaces of the sloping wall portions 34A of the jaw portions 34.

The winding of the rectangular wire 12b of the first loop of the second layer is started from a state in which the guides 50 are positioned in the above-described manner, and the rectangular wire 12a is wound on top of the rectangular wire 12b of the first layer while the laminated core pieces 30 are being rotated.

The rectangular wire 12a is wound on while being guided by the guide surfaces 52 and the insulating components 11. FIG. 10A is a typical view showing a state partway through the winding on of the rectangular wire 12b of the first loop of the second layer.

Once the winding on of the rectangular wire 12b of the first loop of the second layer has ended, the guides 50 are moved to a position where they guide the winding on of the rectangular wire 12b of the second loop of the second layer. Namely, as is shown in FIG. 10B, the guides 50 are placed such that the distal end portions 53 of the arms 51 of the guides 50 are moved forward into the coil housing portions 61 of the slots 60, and the distal end portions 53 of the arms 51 are placed so as to be in contact with the rectangular wire 12b of the first loop of the second layer, and such that the guide surfaces 52 on the distal end portions 53 of the arms 51 are substantially flush with the side surfaces on the outer side in the radial direction of the rectangular wire 12b of the first loop of the second layer.

The winding of the rectangular wire 12b of the second loop of the second layer is started from a state in which the guides 50 are positioned in the above-described manner, and the rectangular wire 12b is then wound on top of the rectangular wire 12a of the first layer while the guides 50 are being rotated together with the laminated core pieces 30, and during the period in which the laminated core pieces 30 are being rotated for one rotation, the guides 50 are moved towards the outer side in the radial direction for the distance of the width dimension of the rectangular wire 12b. FIG. 10B is a typical view showing a state partway through the winding on of the rectangular wire 12a of the second loop of the second layer.

In the same way, each time the laminated core piece 30 is rotated for one rotation, the rectangular wire 12b of the second layer is wound in sequence for five loops while the rectangular wire 12b is being guided by the guide surfaces 52 and by the wall surface on the outer side in the radial direction of the rectangular wire 12b of the second layer, at the same time as the guides 50 are being moved the distance of the width dimension of the rectangular wire 12b towards the outer side in the radial direction. At this time, the ellipticity of the rectangular wire 12b of the second layer is adjusted such that the gaps between the slots 60 and the rectangular wire 12b are disappeared. FIG. 10C is a typical view showing a state partway through the winding on of the rectangular wire 12b of the third loop of the second layer.

The rectangular wire 12b of the third layer is wound on in the same way as the rectangular wire 12a of the first layer, which is an odd-numbered layer. At this time, the slot opening width of the slot in the third layer is different from the slot opening width in the second layer. Because of this, the ellipticity of the rectangular wire 12b in the third layer is adjusted such that the gaps between the slots 60 and the rectangular wire 12b are disappeared.

Note that the movement of the guides 50 in the even-numbered layers (the second and fourth layers) around which the rectangular wire 12 is wound at the same time as it is being moved from the inner side in the radial direction towards the outer side in the radial direction is substantially the same as the movement of the guides 50 in the above-described second layer.

In this manner, by using the guides 50, it is possible to guide the rectangular wire 12 into the interior of the slots 60 and then wind the rectangular wire 12 around the slots.

Figure 9C:
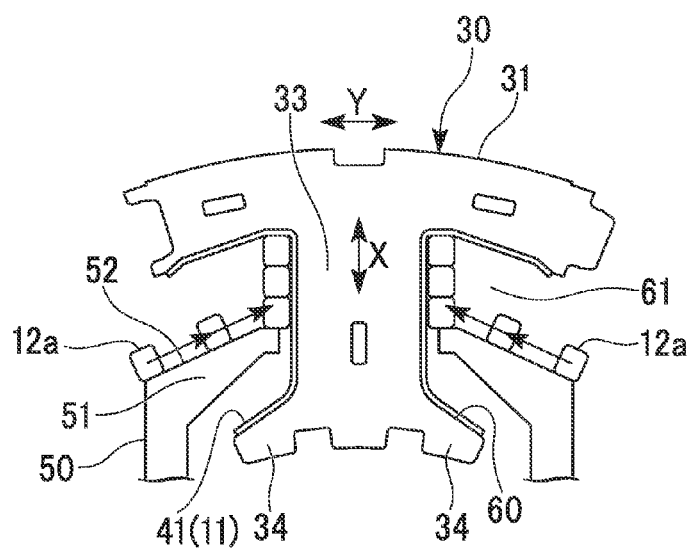
FIG. 9c is a view illustrating a procedure employed to wind a first layer of a rectangular wire around a laminated core piece of a brushless motor according to an embodiment of the present invention.

Note that when the rectangular wire 12 is being wound around the odd-numbered layers, as is shown in FIGS. 9A, 9B, and 9C, while the rectangular wire 12 is being wound, both the inner side and the outer side thereof in the radial direction are guided by a wall portion on the inner side in the radial direction of the rectangular wire 12 that has already been wound on in the same layer, and by the distal end 53 of the arms 51 of the guide 50. Because of this, the rectangular wire 12 does not move in a radial direction while it is being wound.

Figure 10A:
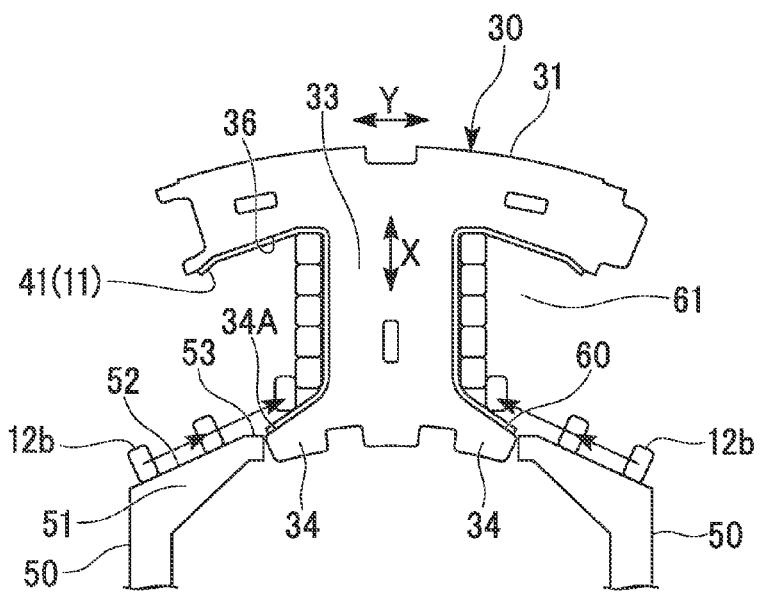
FIG. 10A is a view illustrating a procedure employed to wind a second layer of a rectangular wire around a laminated core piece of a brushless motor according to an embodiment of the present invention.
Figure 10B:
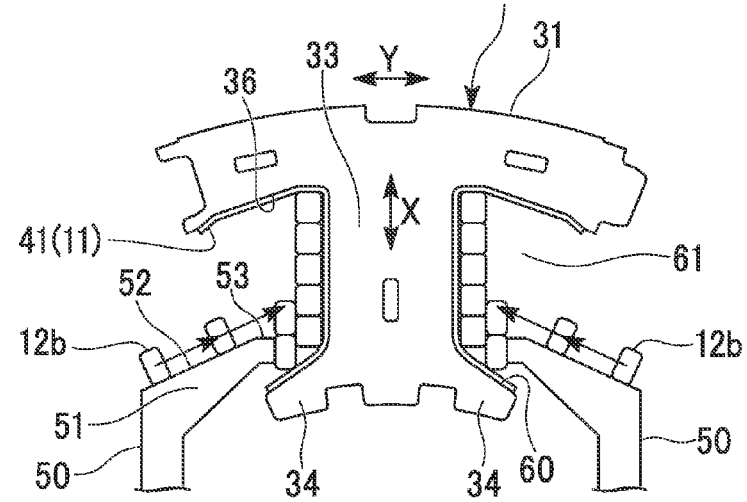
FIG. 10B is a view illustrating a procedure employed to wind a second layer of a rectangular wire around a laminated core piece of a brushless motor according to an embodiment of the present invention.
Figure 10C:
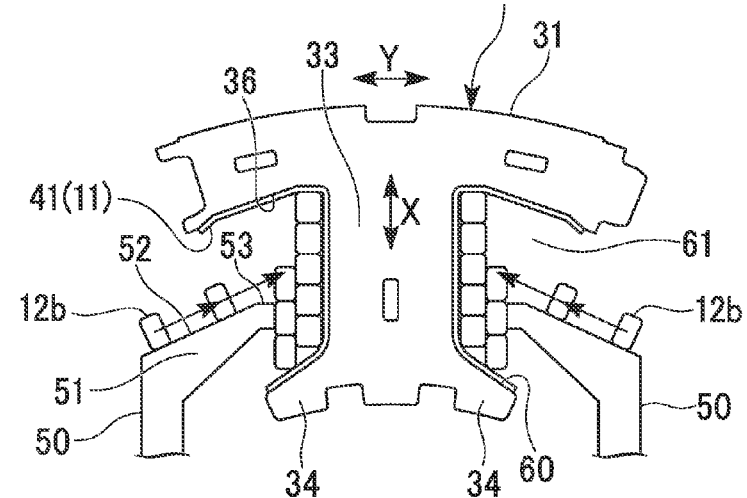
FIG. 10C is a view illustrating a procedure employed to wind a second layer of a rectangular wire around a laminated core piece of a brushless motor according to an embodiment of the present invention.

However, when the rectangular wire 12 is being wound around the even-numbered layers, as is shown in FIGS. 10A, 10B, and 10C, although movement of the rectangular wire 12 towards the inner side in the radial direction is restricted while it is being wound, by the wall portion on the inner side in the radial direction of the rectangular wire 12 that has already been wound on in the same layer, there is a space on the outer side in the radial direction of the rectangular wire 12 while it is being wound, and there is no guide component to restrict the movement thereof in this direction. Because of this, there is a possibility that the rectangular wire 12 will slide towards the outer side in the radial direction while it is being wound on.

If the rectangular wire 12 actually moves in the radial direction while it is being wound on, this has an adverse effect on subsequent windings of the rectangular wire 12, and it becomes difficult to arrange the rectangular wire 12 in rows without any gaps being formed. As a result of this, there is a possibility that the space factor will deteriorate.

Figure 11:
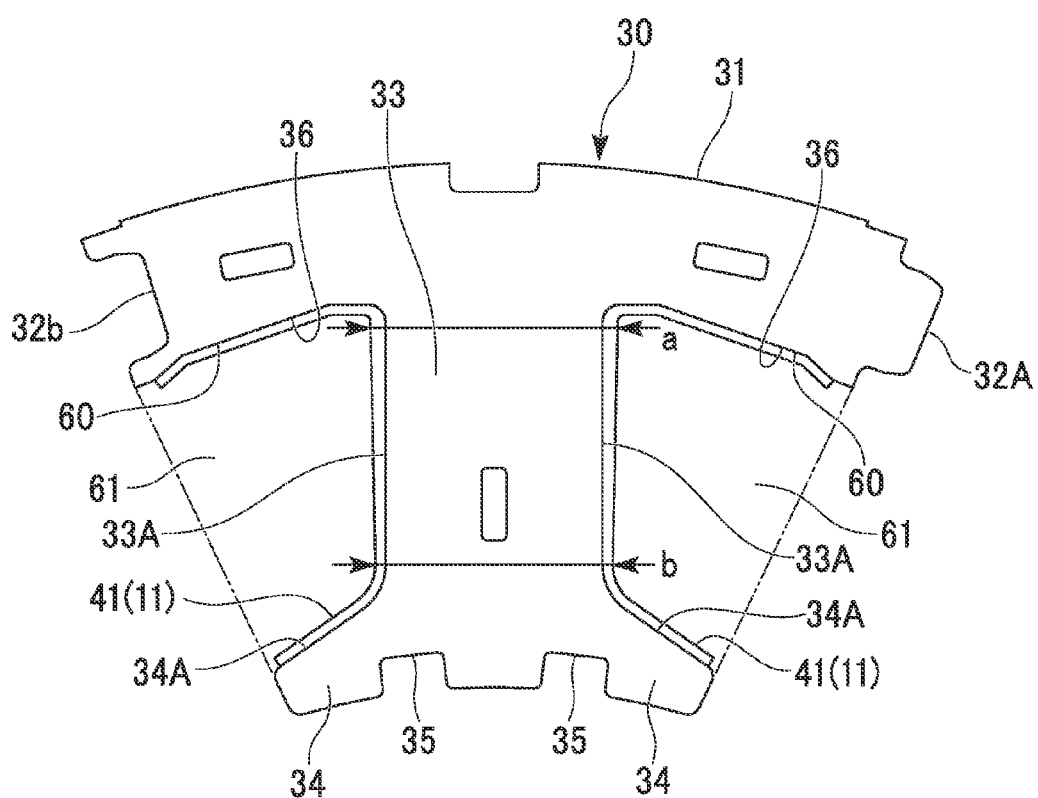
FIG. 11 is a cross-sectional view of a laminated core piece and an insulating component according to another embodiment of the present invention.

Therefore, in order to prevent this happening, as is shown in FIG. 11, a slight taper may be formed on the outer surface of the insulating components 11 by making the thickness on the outer side in the radial direction of the insulating components 11 that are positioned in the slot bottom portion 33A thicker than the thickness on the inner side in the radial direction thereof, so that the distances between the bottom portions of the slots 60 are set such that a distance b on the inner side in the radial direction is smaller than a distance a on the outer side in the radial direction (a>b). As a result of this, when the rectangular wire 12 is being wound onto an odd-numbered layer, it is possible to prevent the rectangular wire 12 from sliding towards the outer side in the radial direction while it is being wound by the slope of the surface of the insulating components 11.

Note that it is also possible to set the distances between the bottom portions of the slots 60 such that the distance on the inner side in the radial direction is smaller than the distance on the outer side in the radial direction by making the thickness of the insulating component 11 an unchanging, uniform thickness, and by making the width of the teeth portion 33 of the laminated core pieces 30 smaller on the inner side in the radial direction than on the outer side in the radial direction as long as this width is not made so small that it has a harmful effect on the magnetic characteristics.

As has been described above, according to the present embodiment, by making the ellipticity of the rectangular wire 12a the smallest at the innermost layer of the coil 8, the amount of deformation when the rectangular wire 12a of the innermost layer is being molded from the round wire 71 is reduced, and it is possible to reduce the amount of stress on the enamel coating and limit any deterioration in the flexibility of the rectangular wire 12a in the innermost layer.

Moreover, when the rectangular wire 12 is being wound around the slots 60, the rectangular wire 12a is bent substantially 90° into an arc shape in the bend portions 15. As a consequence of this, because the radius of curvature of the rectangular wire 12 decreases as it moves towards the inner side layers, the stress applied to these portions increases, however, because the ellipticity of the rectangular wire 12 also decreases moving towards the inner side layers, it tends not to come under as much stress as the rectangular wire 12 in the inner side layers.

Namely, it is possible to form a coil 8 in which the ellipticity of the rectangular wire 12 becomes greater moving from the inner layers of the coil 8 towards the outer layers thereof, and in which the flexibility of the rectangular wire 12 does not deteriorate and the insulation properties are maintained.

Moreover, the ellipticity of the rectangular wire 12 in each of the layers is set in accordance with the width dimensions of the slots 60 in each layer of the coil 8 such that the generation of gaps between the slots 60 and the rectangular wire 12 is suppressed. Because of this, the space factor is improved.

Moreover, in the stator core 10 of a brushless motor 1 in which this winding structure for a rectangular wire is employed, it is possible to improve the space factor in the coil 8 without reducing the flexibility of the rectangular wire 12. Because of this, it is possible to improve the output density of the brushless motor 1, and to achieve reductions in both size and cost.

Note that the present invention is not limited to the present embodiment, and various modifications and the like may be made thereto insofar as they do not depart from the spirit or scope of the present invention.

For example, in the present embodiment, the number of winding layers of the rectangular wire 12 is set at five layers, however, the number is not limited to this and may be set at four layers or less, or at six layers or more. Moreover, the number of winds of the rectangular wire 12 in each layer is not limited to the numbers described above. In other words, the number of layers and the number of winds may be set in accordance with the shape and size of the slots 60.

Moreover, in the present embodiment, a structure is employed in which the ellipticities of the rectangular wire 12b in the second and third layers are adjusted in accordance with the width dimensions of the slot opening in each layer. However, in the same way, it is also possible for the ellipticities of the rectangular wire 12 in the fourth and fifth layers to be different from the ellipticities of the rectangular wire 12b in the second and third layers. Furthermore, the ellipticities of the rectangular wire 12b in each one of the layers may all be the same. Namely, the ellipticities are appropriately set in accordance with the shape and size of the slots 60 after consideration has been given as to how to suppress any gaps being generated between the slots 60 and the rectangular wire 12.

In addition, in the present embodiment, a case has been described in which the ellipticity of the rectangular wire 12 is set by squeezing the round element wire 71 once from the sides and twice from above and below. However, it is also possible to set the ellipticity of the rectangular wire 12 by squeezing the round element wire 71 twice from the sides and once from above and below. In addition, the ellipticity of the rectangular wire 12 is not limited to being set by squeezing the round element wire 71 twice in a single direction, and it may be squeezed three or more times in a single direction. In this case, a fourth roller, a fifth roller, etc. may be provided on the downstream side (on the right side in FIG. 7) of the third roller 76 of the rectangular wire molding apparatus 70.

Moreover, in the present embodiment, a case in which the stator core 10 is formed by laminated core pieces 30 that are separated into segments in a circumferential direction, namely, in which a split-core system is employed has been described. However, the winding wire structure of the rectangular wire 12 of the present embodiment can be applied even when the stator core 10 does not have a split-core structure, but is an integrally molded component.

Furthermore, in the present embodiment, a case has been described in which the core main bodies 31 (the teeth portions 33) have a predetermined skew angle such that they stand on a slant while also twisting relative to the longitudinal direction of the stator core 10 (relative to the axial direction of the brushless motor). However, the winding wire structure of the rectangular wire 12 of the present embodiment can be applied even when the core main bodies 31 (the teeth portions 33) do not have a skew angle.

Furthermore, in the present embodiment, a structure in which insulating papers 41, which are in the form of paper sheets, are inserted into the slots 60 of the core main bodies 31 has been described. However, the present invention is not limited to this structure, and is also possible to provide a structure in which the portion that is inserted into the slots 60 is integrally formed from resin with the insulator 40.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A winding structure for a rectangular wire comprising: a core that forms a core main body; a teeth portion that is formed extending inwards in a radial direction from the core; and a jaw portion that is formed extending in a circumferential direction from a distal end on the inner side in the radial direction of the teeth portion, wherein
    a coil is formed such that a rectangular wire is wound in multiple layers around a slot that is formed so as to be surrounded by the teeth portion, the core, and the jaw portion;
    an ellipticity of the rectangular wire, which is a ratio of a width dimension of a cross-section thereof relative to a thickness dimension of the cross-section thereof, becomes larger as it is wound from inner layers of the coil towards outer layers thereof, and
    the ellipticity of the rectangular wire in each of the layers is set in accordance with the width dimension of the slot in each layer of the coil such that the generation of gaps between the slot and the rectangular wire is suppressed.

2. The winding structure for a rectangular wire according to claim 1, wherein the core main body is made up of core pieces that are formed by splitting the core, which is formed substantially in a circular cylinder shape, into a plurality of pieces in the circumferential direction, and one of the teeth portions is individually provided for each one of the split core main bodies, and the slots are formed so as to be surrounded by the respective split core main bodies, and by the teeth portions that are provided in the core main bodies, and by the jaw portions that are formed on the teeth portions, and,
    in at least a portion of the layers of the coil that is wound around the slots of the spilt core main bodies, the ellipticity of the rectangular wire that is wound onto the innermost side in the radial direction is different from the ellipticity of the rectangular wire that is wound onto the same layer on the outer side in the radial direction of that rectangular wire and also adjacent thereto, and the coil is housed within a coil housing portion of the slot.

3. The winding structure for a rectangular wire according to claim 2, wherein the slots are formed such that an opening width thereof becomes gradually wider moving from a bottom portion of the slot towards the opening side thereof, and
    the ellipticity of the rectangular wire in each of the layers is set in accordance with the width dimension of the slot in each layer of the coil such that the generation of gaps between the slot and the rectangular wire is suppressed.

4. The winding structure for a rectangular wire according to claim 2, wherein the ellipticity of the rectangular wire that is wound onto the innermost side in the radial direction is set larger than the ellipticity of the rectangular wire that is wound on adjacent thereto.

5. The winding structure for a rectangular wire according to claim 2, wherein the starting end and final end of the coil are a round wire.

6. The winding structure for a rectangular wire according to claim 2, wherein, in the split core main bodies, a pair of the slots are provided sandwiching the teeth portion, and an insulating component that provides insulation between the coil and the core main bodies is mounted on the teeth portion, and the dimensions of the insulating component between bottom portions of the pair of slots are set such that an inner side in the radial direction of the teeth portion is smaller than an outer side in the radial direction thereof.

7. The winding structure for a rectangular wire according to claim 2, wherein the winding structure for a rectangular wire is applied to the formation of a coil in a stator core of a brushless motor.

8. The winding structure for a rectangular wire according to claim 1, wherein the slots are formed such that an opening width thereof becomes gradually wider moving from a bottom portion of the slot towards the opening side thereof, and
    the ellipticity of the rectangular wire in each of the layers is set in accordance with the width dimension of the slot in each layer of the coil such that the generation of gaps between the slot and the rectangular wire is suppressed.

9. The winding structure for a rectangular wire according to claim 8, wherein the starting end and final end of the coil are a round wire.

10. The winding structure for a rectangular wire according to claim 8, wherein, in the split core main bodies, a pair of the slots are provided sandwiching the teeth portion, and an insulating component that provides insulation between the coil and the core main bodies is mounted on the teeth portion, and the dimensions of the insulating component between bottom portions of the pair of slots are set such that an inner side in the radial direction of the teeth portion is smaller than an outer side in the radial direction thereof.

11. The winding structure for a rectangular wire according to claim 8, wherein the winding structure for a rectangular wire is applied to the formation of a coil in a stator core of a brushless motor.

12. The winding structure for a rectangular wire according to claim 1, wherein the starting end and final end of the coil are a round wire.

13. The winding structure for a rectangular wire according to claim 1, wherein, in the split core main bodies, a pair of the slots are provided sandwiching the teeth portion, and an insulating component that provides insulation between the coil and the core main bodies is mounted on the teeth portion, and the dimensions of the insulating component between bottom portions of the pair of slots are set such that an inner side in the radial direction of the teeth portion is smaller than an outer side in the radial direction thereof.

14. The winding structure for a rectangular wire according to claim 1, wherein the winding structure for a rectangular wire is applied to the formation of a coil in a stator core of a brushless motor.

* * * * *